United States Patent [19]

Sugawara

[11] Patent Number: 5,303,233
[45] Date of Patent: Apr. 12, 1994

[54] ARRANGEMENT FAVORABLY CARRYING OUT A CONNECTION BY THE USE OF AN INTERMEDIATE CONVERSION PARAMETER BETWEEN INPUT AND OUTPUT VIRTUAL CHANNEL IDENTIFIERS (VCI'S)

[75] Inventor: Tugio Sugawara, Tokyo, Japan

[73] Assignee: NEC Corporation, Tokyo, Japan

[21] Appl. No.: 703,643

[22] Filed: May 20, 1991

[30] Foreign Application Priority Data

May 18, 1990 [JP] Japan .................................. 2-129568

[51] Int. Cl.$^5$ .......................................... H04Q 11/04
[52] U.S. Cl. ..................................... 370/60; 370/94.1
[58] Field of Search ..................... 370/94.1, 95.1, 91, 370/92, 60, 16, 58.1, 58.2, 94.2, 94.3, 60.1, 58.3, 53; 340/825.5, 825.51, 825.52

[56] References Cited

U.S. PATENT DOCUMENTS

| | | | |
|---|---|---|---|
| 4,745,599 | 5/1988 | Raychaudhuri | 370/94.1 |
| 4,947,388 | 8/1990 | Kuwahara et al. | 370/60 |
| 5,062,106 | 10/1991 | Yamazaki et al. | 370/60 |
| 5,072,440 | 12/1991 | Isono et al. | 370/16 |
| 5,079,762 | 1/1992 | Tanabe | 370/60 |
| 5,119,369 | 6/1992 | Tenabe et al. | 370/60 |

Primary Examiner—Douglas W. Olms
Assistant Examiner—Atit Patel
Attorney, Agent, or Firm—Sughrue, Mion, Zinn, Macpeak & Seas

[57] ABSTRACT

In an arrangement located between input and output paths to carry out a broadcast operation, an input virtual channel identifier (VCI; is included in an asynchronous transfer mode (ATM) cell and given to a selected one of parameter production elements to access a conversion table connected to the selected parameter production element and to read a specific intermediate conversion parameter indicative of the broadcast operation out of the conversion table. The specific intermediate conversion parameter is sent to a first switch together with the ATM cell and to a second switch to be delivered to a plurality of the output paths. On the plurality of the output paths, the specific intermediate conversion parameters are converted into output VCI's which are different from and independent of one another. Thus, the broadcast operation is favorably carried out in the arrangement.

4 Claims, 3 Drawing Sheets

ARRANGEMENT FAVORABLY CARRYING OUT A CONNECTION BY THE USE OF AN INTERMEDIATE CONVERSION PARAMETER BETWEEN INPUT AND OUTPUT VIRTUAL CHANNEL IDENTIFIERS (VCI'S)

BACKGROUND OF THE INVENTION

This invention relates to an arrangement for use in a broadband integrated services digital network (ISDN) to arrange a connection path or a route between a plurality of input paths and a plurality of output paths.

Such a broadband ISDN is effective to provide a wide variety of services for communication of an audio signal, a video signal, and a data signal. Recently, it has been pointed out that the broadband ISDN is preferably operable in an asynchronous transfer mode (ATM) wherein a transmission data signal to be delivered to an identical destination asynchronously or unperiodically appears on a transmission line. In this event, each transmission data signal is transmitted in the form of a cell. Such a cell may be called an asynchronous transfer mode cell.

In order to identify a logical path of each asynchronous transfer mode cell, a virtual channel identifier (VCI) is included in each asynchronous transfer mode cell to relatively specify a logical channel number used in the logical path. In other words, the virtual channel identifier never specifies a physical channel number or a physical path. This shows that, when identical virtual channel identifiers are produced from different terminal units, such identical virtual channel identifiers are transmitted through different transmission paths. From this fact, it is readily understood that each identical virtual channel identifier is regardless of each other as long as such identical virtual channel identifiers are transmitted through different transmission paths.

At any rate, each asynchronous transfer mode cell is given to an asynchronous transfer mode exchange, namely, an arrangement which is located between a plurality of input paths and a plurality of output paths to arrange a connection path or a route between the input and the output paths. In this case, an input asynchronous transfer mode cell is sent to the asynchronous transfer mode exchange through one of the input paths along with an input virtual channel identifier and is transmitted through a selected one of the output paths that is determined by the asynchronous transfer mode exchange. Thus, an output asynchronous transfer mode cell is sent from the asynchronous transfer mode exchange together with an output virtual channel identifier. In this event, the asynchronous transfer mode exchange carries out a self-routing switching operation so as to decide the route between the input and the output paths.

Herein, it is to be noted that the input virtual channel identifier is usually different from the output virtual channel identifier and should therefore be converted in the asynchronous transfer mode exchange into the output virtual channel identifier which is sent through one of the output paths.

To this end, conversion of the input virtual channel identifier into the output virtual channel identifier is performed before the self-routing switching operation in a conventional asynchronous transfer mode system that is described in a paper contributed by K. Hajikano et al and entitled "Asynchronous transfer mode switching architecture for broadband ISDN" (pages 911 to 915) to IEEE International Conference on Communications '88. Such conversion is effective to selectively connect a single one of the input paths to a single one of the output paths. A connection between a single input path and a single output path and its operation will be called a one-to-one connection and a one-to-one connection mode.

Herein, the connection is not always restricted to the one-to-one connection but may be made between a single input path and a plurality of output paths which are equal in number to N, where N is a natural number. The connection between the single input path and the N output paths and its operation will be referred to as a one-to-N connection hereinafter. The one-to-N connection lends itself to simultaneously transfer information from a single terminal unit or transmitting end to a plurality of terminal units or receiving ends. Stated otherwise, it is possible to broadcast the information to the plurality of the receiving ends during a mode of the one-to-N connection. Such a mode may therefore be called a broadcast mode.

Let the conventional asynchronous transfer mode system be operated in the broadcast mode in response to the input asynchronous transfer mode cell which includes the single input virtual channel identifier and which is given through a single one of the input paths. Under the circumstances, the single input virtual channel identifier should be converted before the self-routing switching operation into a plurality of output virtual channel identifiers which are different from and independent of one another.

However, it is difficult to convert the single input virtual channel identifier into the plurality of the output virtual channel identifiers on the single input path. Accordingly, the conventional asynchronous transfer mode system is not effectively operable in the broadcast mode.

SUMMARY OF THE INVENTION

It is an object of this invention to provide an arrangement which is located between a plurality of input paths and a plurality of output paths and which is operable in a broadcast mode.

It is another object of this invention to provide an arrangement of the type described, which is capable of readily converting an input virtual channel identifier into a plurality of output virtual channel identifiers.

An arrangement to which this invention is applicable is located between a plurality of input paths and a plurality of output paths and is operable in response to each of input asynchronous transfer mode cells that includes an input virtual channel identifier and that is given through each of the input paths. The arrangement is for producing an output virtual channel identifier of an output asynchronous transfer mode cell from the input virtual channel identifier.

According to this invention, the arrangement comprises conversion parameter producing means connected to the plurality of the input paths for producing an intermediate conversion parameter between the input and the output virtual channel identifiers. The intermediate conversion parameter corresponds to the input virtual channel identifier. The arrangement further comprises output path deciding means connected to the conversion parameter producing means for deciding at least one of the output paths that corresponds to the intermediate conversion parameter to allow the intermediate conversion parameter to pass therethrough and header converting means between the output path deciding means and the output paths for converting the intermediate conversion parameter into the output virtual channel identifier to form the output asynchronous transfer mode cell after the at least one of the output paths is decided by the output path deciding means.

DESCRIPTION OF THE PREFERRED EMBODIMENTS

Figure 1:
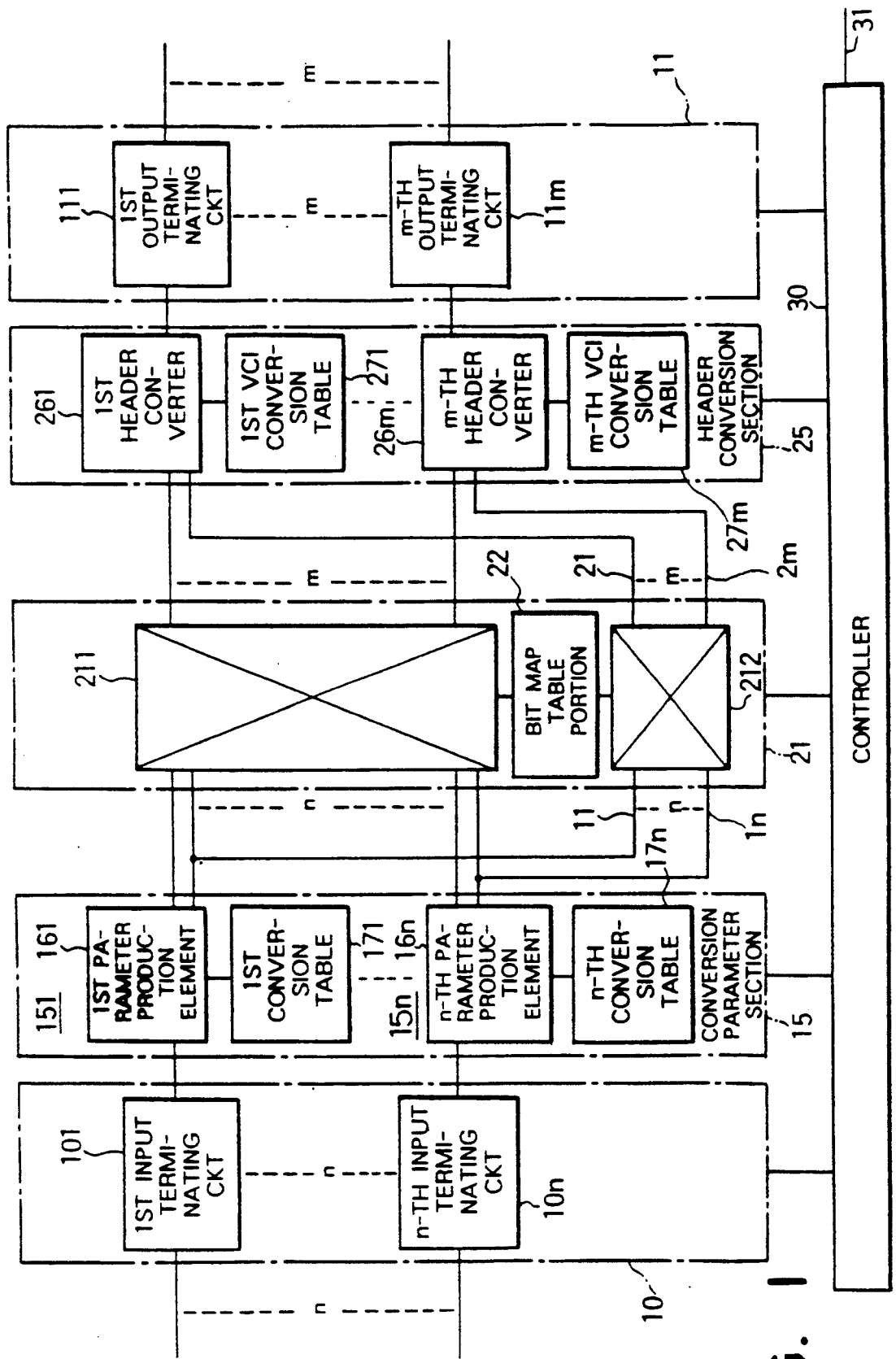
FIG. 1 is a block diagram of an arrangement according to a preferred embodiment of this invention.

Referring to FIG. 1, an arrangement according to a preferred embodiment of this invention is located between first through n-th input paths and first through m-th output paths and is operable as an exchange between the input and the output paths. In the example being illustrated, the arrangement is for use in combination with first through n-th input terminating circuits 101 to 10n connected to the first through the n-th input paths and first through m-th output terminating circuits 111 to 11m connected to the first through the m-th output paths. The first through the n-th input terminating circuits 101 to 10n and the first through the m-th output terminating circuits 111 to 11m may be collectively called input and output terminating sections 10 and 11, respectively.

The illustrated arrangement comprises a conversion parameter section 15 connected to the input terminating section 10. Specifically, the conversion parameter section 15 comprises first through n-th parameter units 151 to 15n connected to the first through the n-th terminating circuits 101 to 10n.

In the illustrated example, the first through the n-th parameter units 151 to 15n are composed of first through n-th parameter production elements 161 to 16n connected to the first through the n-th terminating circuits 101 to 10n and first through n-th conversion tables 171 to 17n connected to the first through the n-th parameter production elements 161 to 16n.

The first through the n-th parameter production elements 161 to 16n are connected to a switching section 21. The switching section 21 comprises a first switch 211 and a second switch 212 each of which is operable in a manner to be described later and which carries out an exchange operation between the input paths, n in number, and the output paths, m in number. In this connection, each of the first and the second switches 211 and 212 may be called an n×m switch. Herein, each switch 211 and 212 carries out a self-routing switching operation to determine a route or routes between the input and the output paths. In addition, each switch 211 and 212 has a copy function, as will become clear.

Furthermore, a bit map table portion 22 is included in the switching section 21 and is operable in cooperation with the first and the second switches 211 and 212 in a manner to be described.

The switching section 21 is connected to a header conversion section 25 which comprises first through m-th header converters 261 to 26m and first through m-th output virtual channel identifier (VCI) conversion tables 271 to 27m accessible by the first through the m-th header converters 261 to 26m. The first through the m-th header converters 261 to 26m are connected to the first through the m-th output paths through the first to the m-th output terminating circuits 111 to 11m.

In the illustrated example, the input and the output terminating sections 10 and 11, the conversion parameter section 15, the switching section 21, and the header conversion section 25 are all controlled by a controller 30, as will become clear as the description proceeds. The controller 30 is connected to another maintenance module or another arrangement (not shown) through a signal line 31.

With this structure, the first through the n-th parameter units 151 to 15n are supplied from terminal units (not shown) through the input terminating circuits 101 to 10n with input asynchronous transfer mode (ATM) cells each of which is composed of a user information field and a header field both of which have fixed lengths.

An input virtual channel identifier (VCI) is positioned or arranged in the header field to identify a logical channel of each input ATM cell. An input virtual path identifier (VPI) may be also positioned in the header field to identify a logical path of each input ATM cell. In this event, the input VCI specifies a logical channel number used in the logical path specified by the VPI.

On the other hand, the controller 30 is supplied from another arrangement with a mode signal indicative of either a one-to-one connection mode or a one-to-N connection mode (namely, a broadcast mode). Likewise, the controller 30 is given information related to the input and the output paths and the input and the output VCI's in a known manner. Such information is sent from another arrangement prior to connection between the input and the output paths.

In FIG. 1, let the input ATM cell arrive at a selected one of the first through the n-th input terminating circuits 101 to 10n. Each input terminating circuit 101 to 10n acts to process a frame in response to a synchronous transfer mode cell and/or to carry out conversion between optical and electrical signals. Thereafter, the input ATM cell is sent from the selected input terminating circuit to a selected one of the first through the n-th parameter production elements 161 to 16n and is subjected by the selected parameter production element to cyclic redundancy check (CRC).

When an error is detected by the selected parameter production element as a result of the cyclic redundancy check, the selected parameter production element renders the ATM cell into an invalid cell.

On the other hand, when the input ATM cell is normal and is not empty, the selected parameter production element accesses the corresponding conversion table connected to the selected parameter production element.

Herein, it is assumed that the selected parameter production element is the first parameter production element 161 and that the input VCI of the input ATM cell is sent to the first conversion table 171 as an index.

Each of the first through the n-th conversion tables 171 to 17n has a plurality of addresses which are loaded with intermediate conversion parameters corresponding to the input VCI's of the input ATM cells.

Accessed by the input VCI of the input ATM cell, the first conversion table 171 reads the intermediate conversion parameter out of the address indicated by the input VCI.

The intermediate conversion parameter read out of the first conversion table 171 is sent to both the first and the second switches 211 and 212 in parallel through first through n-th incoming information lines 11 tó 1n. As a result, the first and the second switches 211 and 212 are operable independently of each other. In addition, the intermediate conversion parameter in question is used to access the bit map table portion 22 under control of the controller 30.

Responsive to the intermediate conversion parameter, the second switch 212 carries out the self-routing switching operation and produces the intermediate conversion parameter itself through selected one or ones of outgoing information routes 21 to 2m.

Figure 2:
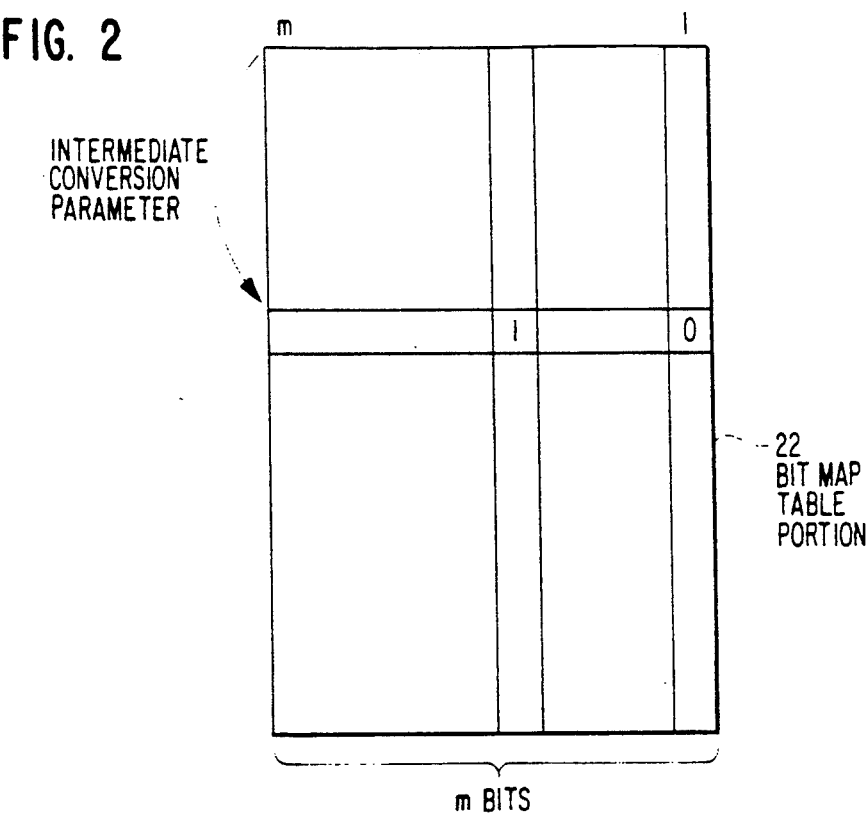
FIG. 2 is a schematic view for use in describing operation of a bit map table portion included in the arrangement illustrated in FIG. 1.

Referring to FIG. 2 together with FIG. 1, the bit map table portion 22 has a plurality of table addresses each of which is composed of a bit width of m bits and which is accessed by the intermediate conversion parameter. From this fact, it is readily understood that the bit width of each address in the bit map table portion 22 is equal to the number of the first through the m-th output paths and that the m bits in each address correspond to the first through the m-th output paths, respectively.

More specifically, the m bits in a single address take a logic "1" level only at one bit that corresponds to a desired one of the output paths with the remaining bits kept at a logic "0" level when the one-to-one connection mode is indicated by the mode signal. On the other hand, the m bits in a single address take the logic "1" levels at a plurality of the m bits that correspond to the output paths which are to be connected in the one-to-N connection mode (namely, the broadcast mode).

Figure 3:
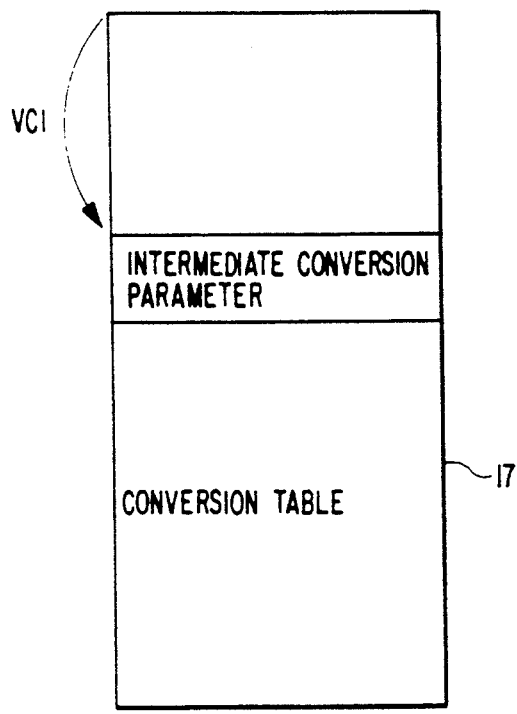
FIG. 3 is a schematic view for use in describing operation of a conversion table used in the arrangement illustrated in FIG. 1.

Referring to FIG. 3 along with FIG. 1, each of the first through the n-th conversion tables 171 to 17n (suffixes omitted in FIG. 3) is loaded with intermediate conversion parameters under control of the controller 30 and is accessed by the input VCI of each input ATM cell. A specific one of the intermediate conversion parameters is memorized in each of the first through the n-th conversion tables 171 to 17n and takes a common value. The specific intermediate conversion parameter is read out of each of the first through the n-th conversion tables 171 to 17n when the broadcast mode is indicated by the input ATM cell, as will become clear as the description proceeds. In this connection, the specific intermediate conversion parameter is processed as the common value no matter where an input or an output operation is made.

Figure 4:
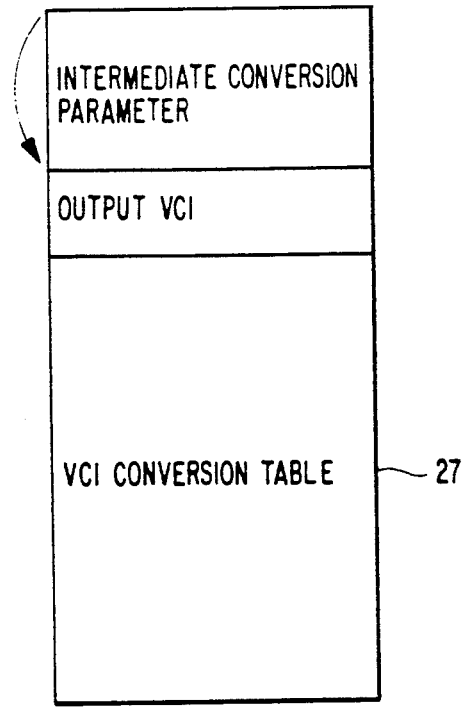
FIG. 4 is a similar view for use in describing operation of a VCI conversion table illustrated in FIG. 1.

Referring to FIG. 4 in addition to FIG. 1, the first through the m-th header converters 261 to 26m are operable in response to the intermediate conversion parameters sent through the second switch 212 to access the first through the m-th VCI conversion tables 271 to 27m (suffixes omitted in FIG. 4). In this event, the first through the m-th VCI conversion tables 271 to 27m are loaded with the output VCI's which are used on the output paths. Accordingly, the output VCI's are read out of the first through the m-th VCI conversion tables 271 to 27m as readout VCI's when the intermediate conversion parameters are given to the first to the m-th VCI conversion tables 271 to 27m through the first to the m-th header converters 261 to 26m.

The output VCI's are sent from the first the m-th conversion tables 271 to 27m to the first through the m-th header converters 261 to 26m. In this case, the first through the m-th header converters 261 to 26m are supplied from the first switch 211 with reception ATM cells through output routes of the first switch 211. The reception ATM cells may be identical with the input ATM cells and include header fields in which the input VCI's are positioned.

Under the circumstances, the header converters 261 to 26m substitute the output VCI's for the input VCI's to form the output ATM cells. In other words, the input VCI's are rewritten into the output VCI's by the header converters 261 to 26m. Thus, the input ATM cells are exchanged to the output ATM cells by the use of the illustrated arrangement.

In FIGS. 1 and 4, each of the VCI conversion tables 27 (suffixed omitted) is connected to the corresponding header converter 26 and is loaded with the output VCI's, as illustrated in FIG. 4. When the VCI conversion table 27 is accessed by the intermediate conversion parameter, the output VCI is read out of an address indicated by the intermediate conversion parameter.

From this fact, it is readily understood that each of the VCI conversion tables 27 is located in one-to-one correspondence to the header converters 26 connected to each output path and is capable of independently carrying out conversion of the intermediate conversion parameter into the output VCI. This shows that the first through the m-th header converters 26 can supply the output paths with the output VCI's different from one another even when the same intermediate conversion parameters are given to the first through the m-th header converters 26.

Herein, description will be made about an operation of the arrangement illustrated in FIGS. 1 through 4. Let the one-to-one connection mode be indicated by the controller 30 illustrated in FIG. 1 on condition that the ATM cell is given to the first parameter production element 161 through the first input terminating circuit 101 and includes the input VCI. It is assumed that the input VCI is to be sent from the first header converter 261 to a first one of the output paths. Under the circumstances, the ATM cell is delivered to the first switch 211 through the first parameter production element 161 along with the input VCI. The ATM cell is sent to the first header converter 261 by the self-routing switching operation carried out under control of the controller 30.

On the other hand, the input VCI is sent from the first parameter production element 161 to the first conversion table 171. In the first conversion table 171, the intermediate conversion parameter is memorized in the manner illustrated in FIG. 3 and is representative of a physical address assigned to the first header converter 261. The intermediate conversion parameter is delivered to the second switch 212 to be sent to the first VCI conversion table 271 through the first header converter 261. As a result, the output VCI is read out of the first VCI conversion table 271 and substituted for the input VCI in the first header converter 261.

Figure 5:
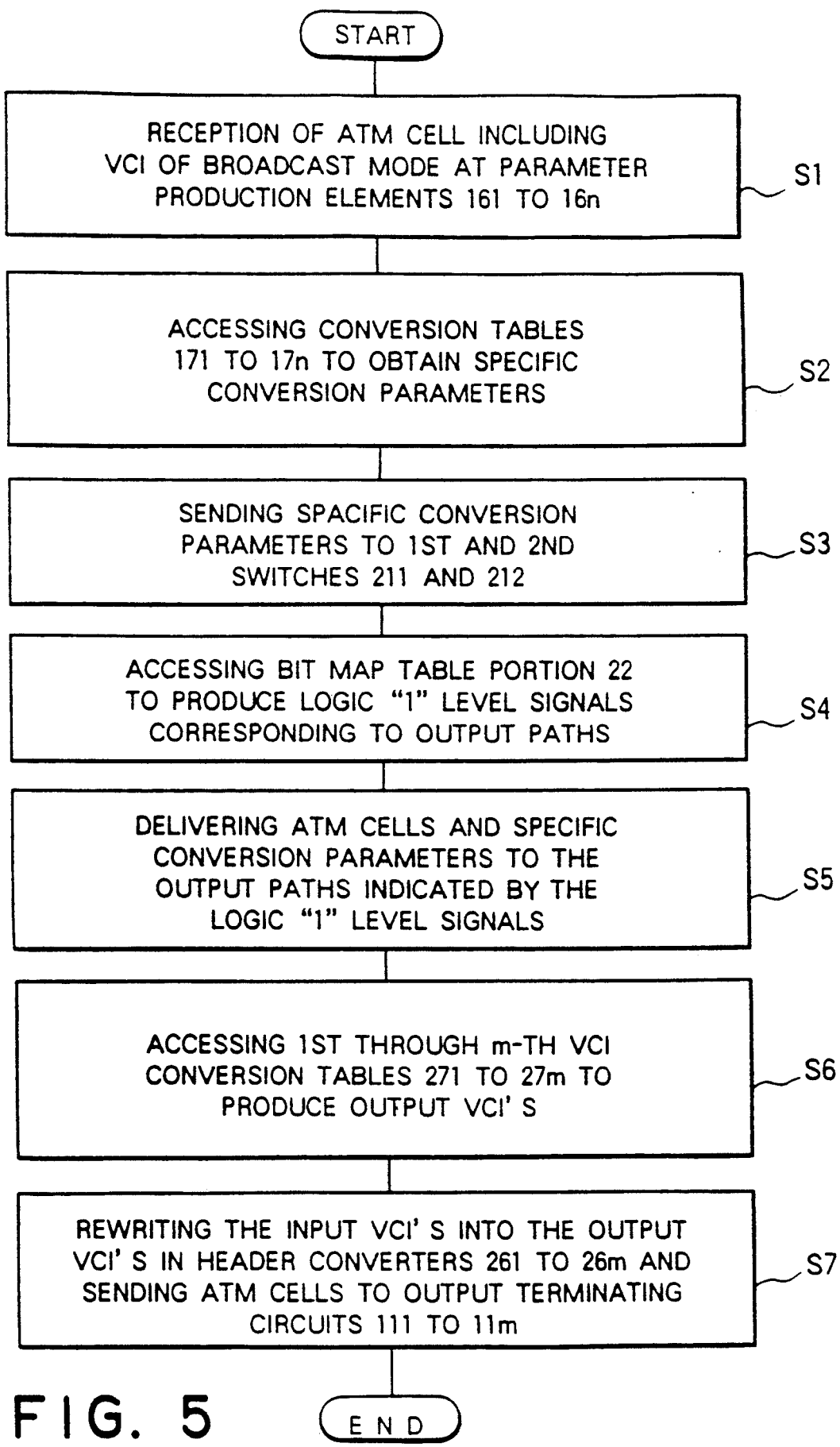
FIG. 5 is a flow chart for use in describing operation of the arrangement illustrated in FIG. 1.

Referring to FIG. 5 afresh and FIG. 1 again, description will be made about the one-to-N connection mode (broadcast mode). Such a one-to-N connection mode is indicated by the controller 30. Herein, it is assumed that the input ATM cell is given to the first parameter production element 161 together with the VCI and is to be delivered to all of the first through the m-th header converters 261 to 26m. In this case, the bit map table portion 22 as shown in FIG. 2 has a predetermined address of m bits all of which take the logic "1" levels. The predetermined address is assumed to be indicated by the specific intermediate conversion parameter that is memorized in the first conversion table 171. Such a specific intermediate conversion parameter may be memorized in each of the remaining conversion tables 162 to 16n, as mentioned before.

At first, the input ATM cell is received by the first parameter production element 161, as shown at a first step S1. In the broadcast mode, the input VCI of the input ATM cell includes an indication of the broadcast mode given by the controller 30.

At a second step S2, the first parameter production element 161 delivers the input VCI to the first conversion table 171 as illustrated in FIG. 3. Herein, it is to be noted that the first conversion table 171 memorizes the specific intermediate conversion parameter at a prescribed address and that the specific intermediate conversion parameter is read out of the prescribed address of the first conversion table 171 when accessed by the input VCI which includes the indication of the broadcast mode. Accordingly, the specific intermediate conversion parameter is read out of the first conversion table 171 to be sent to the first parameter production element 161. In any event, the specific intermediate conversion parameter is indicative of a broadcast mode and will therefore be often called a broadcast conversion parameter.

The specific intermediate conversion parameter is delivered to the first switch 211 together with the input ATM cell on one hand and to the second switch 212 on the other hand, as shown at a third step S3.

At a fourth step S4, the bit map table portion 22 (FIG. 2) is accessed by the specific intermediate conversion parameter through the first and the second switches 211 and 212. As mentioned before, the specific intermediate conversion parameter specifies the predetermined address of the bit map table portion 22. As a result, the logic "1" levels of the m bits are read out of the bit map table portion 22 to indicate the first through the m-th output paths.

The logic "1" levels of the m bits are sent from the bit map table portion 22 to the first through the m-th output paths at a fifth step S5. Concurrently, the first switch 211 copies the ATM cells while the second switch 212 copies the specific intermediate conversion parameter. Copies of the ATM cell and the specific intermediate conversion parameter are delivered as copied ATM cells and copied specific intermediate conversion parameters to the first through the m-th header converters 261 to 26m.

At a sixth step S6, the first through the m-th header converters 261 to 26m are supplied from the second switch 212 with the specific intermediate conversion parameter and the copied specific intermediate conversion parameters which are sent to the first through the m-th VCI conversion tables 271 to 27m as address signals.

It is mentioned here that the first through the m-th VCI conversion tables 271 to 27m memorize the output VCI's which are determined for the first through the m-th output paths. Responsive to the specific and the copied specific intermediate conversion parameters, the first through the m-th VCI conversion tables 271 to 27m read the output VCI's out of addresses indicated by the conversion parameters at a seventh step S7. The output VCI's are substituted for the input VCI's of the input ATM cells in the first through the m-th header converters 261 to 26m. The output VCI's are different from one another and are independently delivered to the output paths through the first through the m-th output terminating circuits 111 to 11m.

Thus, it is possible to favorably carry out the broadcast operation and to thereby connect a single one of the input paths to a plurality of the output paths.

What is claimed is:

1. An arrangement located between a plurality of input paths and a plurality of output paths and operable in response to each of a plurality of input data signals representing asynchronous transfer mode cells that includes a data signal representing an input virtual channel identifier and that is given through each of said input paths, said arrangement being for producing a data signal representative of an output virtual channel identifier of an output asynchronous transfer mode cell from said input virtual channel identifier, said arrangement comprising:

conversion parameter producing means connected to said plurality of input paths for producing an intermediate conversion parameter between said input virtual channel identifier and said output virtual channel identifier, said intermediate conversion parameter corresponding to the input virtual channel identifier at every one of the input paths and being different from said input and said output virtual channel identifiers;

output path deciding means connected to said conversion parameter producing means for deciding at least one of said output paths that corresponds to said intermediate conversion parameter to allow said intermediate conversion parameter to pass therethrough; and header converting means between said output path deciding means and said output paths for converting said intermediate conversion parameter into said output virtual channel identifier to form said output asynchronous transfer mode cell after said at least one of said output paths is decided by said output path deciding means.

2. An arrangement as claimed in claim 1, wherein a conversion parameter producing means comprises:

a plurality of input conversion tables which are equal in number to said input paths, each of said input parameter conversion tables being for memorizing the intermediate conversion parameter which corresponds to the input virtual channel identifier of each input asynchronous transfer mode cell; and a plurality of parameter supplying means connected to respective ones of said plurality of input paths, respective ones of said plurality of input conversion tables, and said output path deciding means, each of said parameter supplying means being for supplying the intermediate conversion parameter to said output path deciding means;

said header converting means comprising:

a plurality of output conversion tables which correspond to said output paths, each of said output conversion tables being for memorizing the output virtual channel identifier of the output asynchronous transfer mode cell in relation to the intermediate conversion parameter; and output means connected to said output conversion tables and said output paths for producing the output virtual channel identifier corresponding to each asynchronous transfer mode cell output by the arrangement.

3. An arrangement as claimed in claim 1, wherein said output path deciding means comprises:
  parameter switching means connected to said conversion parameter producing means for carrying out a switching operation in response to said intermediate conversion parameter to allow said intermediate conversion parameter to pass therethrough;
  a bit map table for indicating at least one of the output paths in response to said intermediate conversion parameter;
  cell switching means connected to said conversion parameter producing means for carrying out another switching operation in response to said input asynchronous transfer mode cells to allow said input asynchronous transfer mode cells to pass therethrough; and
  means for supplying both said input asynchronous transfer mode cells and said intermediate conversion parameter in parallel to said header converting means.

4. An arrangement located between input and output paths and operable in a broadcast mode in response to an input asynchronous transfer mode cell to connect a selected one of said input paths to a plurality of the output paths, said output asynchronous transfer mode cell including an input virtual channel identifier and being given through said selected one of the input paths, said arrangement being for producing an output virtual channel identifier included in each output asynchronous transfer mode cell, said arrangement comprising:
  conversion parameter producing means supplied with said input asynchronous transfer mode cell for converting said input virtual channel identifier in said broadcast mode into a specific intermediate conversion parameter which specifies said broadcast mode and which corresponds to the input virtual channel identifier at every one of the input paths, said specific intermediate conversion parameter being different from said input and said output virtual channel identifiers being produced together with said input asynchronous transfer mode cell;
  path deciding means connected to said conversion parameter producing means for deciding a plurality of said output paths to be connected to said selected one of the input paths in response to both said specific intermediate conversion parameter and said input asynchronous transfer mode cell to individually send both specific intermediate conversion parameter and said input asynchronous transfer mode cell towards each of said plurality of output paths; and
  header converting means connected to said plurality of the output paths and supplied with both said specific intermediate conversion parameter and said input asynchronous transfer mode cell for individually converting said specific intermediate conversion parameter into said output virtual channel identifier to form said output asynchronous transfer mode cells which are sent through said plurality of the output paths.

* * * * *